3,181,917
RELAY VALVE
Harold L. Dobrikin, Highland Park, and Charles Horowitz, Chicago, Ill., assignors to Berg Airlectro Products Co., Chicago, Ill., a corporation of Illinois
Filed July 26, 1962, Ser. No. 212,542
7 Claims. (Cl. 303—40)

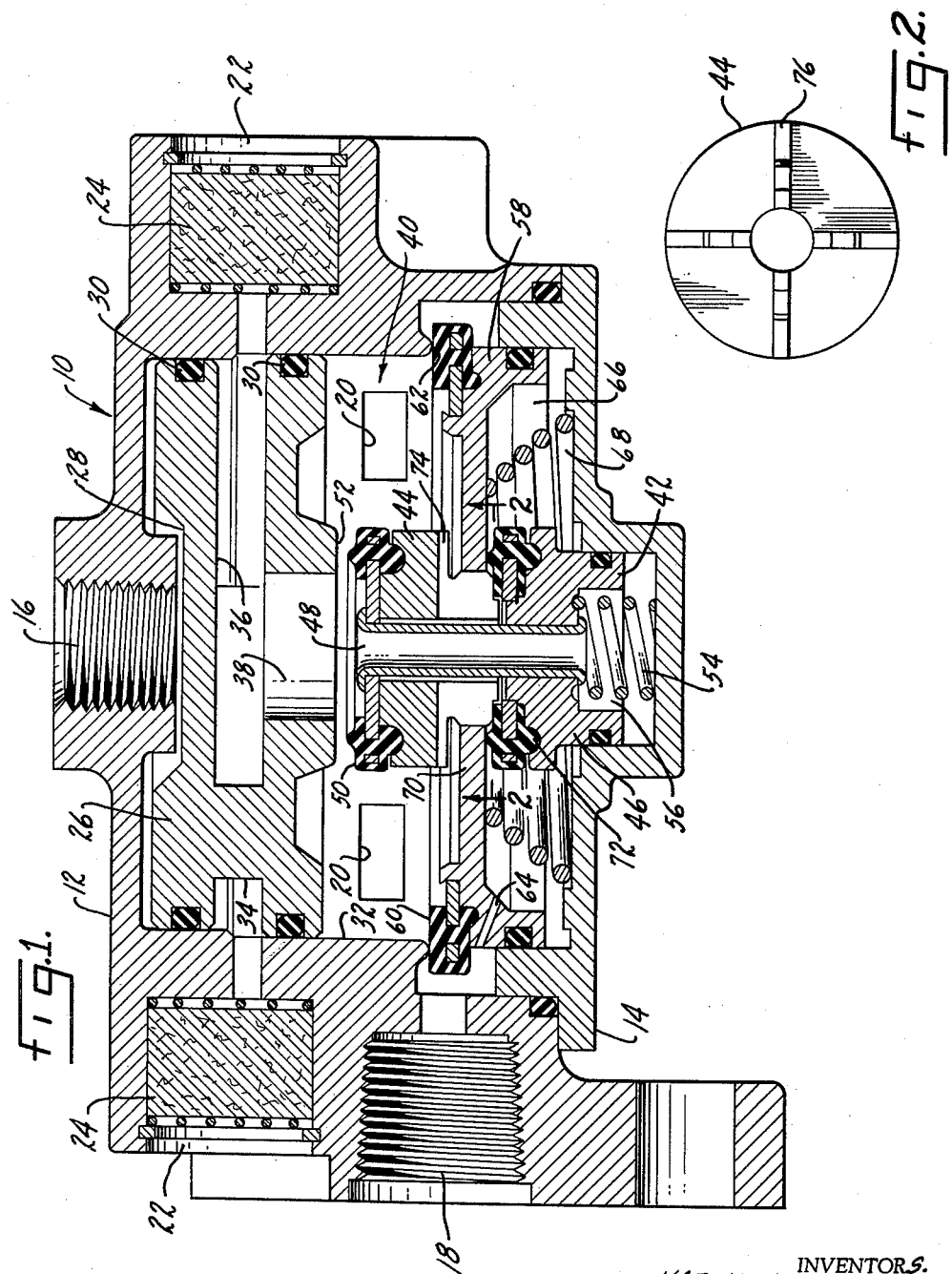

This invention relates to a relay valve and in particular to a relay valve operable by air pressure.

A primary purpose of the invention is to provide a relay valve having an improved response.

Another purpose is a relay valve, operable by air pressure, which is effective upon small changes in pressure.

Another purpose is to provide a relay valve of maximum compactness and simplicity.

Other purposes will appear in the ensuing specification, drawings and claims.

The invention is illustrated diagrammatically in the following drawings wherein:

FIGURE 1 is a vertical section through a relay valve, and

FIGURE 2 is a view along plane 2—2 of FIGURE 1.

In FIGURE 1, a housing 10 may be made up of an upper cup-shaped member 12 and a lower cap or cover 14, the two members being held together by suitable bolts, screws or the like, not shown. The housing 10 may have a first air pressure inlet port 16, designated as the service air inlet, and a second air pressure inlet port 18, normally connected to the air pressure supply tank. The port 16 may be in the top of the housing and the port 18 may be in one side. As the particular relay valve shown has found application on truck-trailer units, outlet ports 20 will connect to the air brakes of such a unit. Suitable exhaust or vent ports 22 may also be formed in the housing and will normally vent to the atmosphere. A suitable filter medium or the like 24 may be employed in the exhaust ports 22 to prevent dirt or other material from entering the relay valve.

Reciprocal within the housing 10 is a first piston 26 having an upper recessed surface 28 positioned opposite the inlet port 16. Suitable O-rings or the like 30 may be used to seal the piston 26 to the interior side walls 32 of the housing. The piston 26 may have an outer annular groove or passage 34 generally in alignment with the vent passages 22 and an inwardly-directed passage 36, connecting to a vertical passage 38, whereby the vent passages or ports 22 are connected with interior chamber 40 into which the outlet ports 20 open. In this way the outlet ports 20 may be in communication with the vent passages 22, when the valve is in the position shown in FIGURE 1.

Mounted for reciprocation in general alignment with the first piston 26 is a second piston 42 having an upper portion 44 and a lower portion 46. The two portions of the piston may be held together by a suitable screw or the like 48. A suitable annular seal member or valve 50 may be positioned around the upper edge of the second piston 42. The valve 50 is in alignment with a valve seat 52 formed on a bottom land or extension of the first piston and, when the first piston moves downwardly, as shown in the drawings, in response to air pressure through port 16, the valve seat 52 and the valve 50 will form a seal closing the vent passages 22 from the chamber 40. The second piston 42 may be biased in an upward direction by a spring 54, which is a rather small spring for use in a valve of the type described. The spring 54 bottoms against the housing and the upper portion of the spring seats within a small chamber 56 in the bottom of piston 42.

A third piston 58 is reciprocal within the housing 10 and is in general alignment with the first piston 26 and the second piston 42. The piston 58 may carry a suitable seal ring 60 at its upper outer edge, said seal ring being in general alignment with a valve seat 62 adjacent the inlet 18 and formed by an extension of wall 32. In the position shown in FIGURE 1 valve 60 forms a seal with the valve seat 62 to prevent air pressure from the tank reaching the outlet ports 20.

The piston 58 may have a small downwardly slanting passage 64 which places the inlet port 18 in communication with an interior chamber 66 in the piston 58 so that pressure through the port 18 will bias the piston in an upward direction to form a tight seal with valve seat 62. A suitable spring or the like 68 is also positioned in chamber 66 and biases piston 58 in an upward direction. It is the combination of spring 68 and air pressure from port 18 which maintains the third piston 58 in the up position of FIGURE 1. The spring 68 will be substantially larger and stronger than spring 54, although this spring again will be somewhat smaller than springs conventionally used in valves of this type.

Piston 58 has an interior annular portion 70 which extends within the second piston and between the portions 44 and 46. The bottom of the portion 70 forms a valve seat and cooperates with a valve element 72 carried at the top of the piston portion 46 to close chamber 66. In this way air pressure coming through passage 64 will remain in chamber 66 and bias piston 58 in an upward direction. The bottom portion of piston section 44 has a plurality of passages 74 which connect chamber 40 with chamber 68 as soon as the second piston has been moved downwardly so that valve element 72 is away from its seat. In the rest position, as shown in FIGURE 1, the top of the portion 70 of the third piston is spaced from the bottom of the upper portion 44 of the second piston 42. In this way, the second piston will move downwardly through a predetermined distance before it contacts the third piston and moves it downwardly. Each of the passages 74 may be separated by one of a plurality of circumferentially spaced vanes 76, as shown in detail in FIGURE 2.

The use, operation and function of the invention are as follows:

The relay valve shown has particular application in truck-trailer units and is used in the air system of such a vehicle. For example, port 16 is connected to the service line of an air brake system so that upon application of the brakes by the driver, air pressure will be admitted though this port and will move the piston 26 in a downward direction. The degree of application by the driver will determine the amount of air pressure coming through port 16. In prior relay valves of this type at least 5 or 6 lbs. of pressure had to be supplied through port 16 before the valve would be operated. The present invention may operate on only a one-half pound pressure difference between port 16 and chamber 40.

In operation, as air pressure is applied through port 16 the piston 26 moves in a downward direction until it strikes the second piston 42. Initial downward movement of the second piston 42, against the small spring 54, will open the passages through the second piston so that air pressure from the storage tank will flow through port 18, passage 64, chamber 66, passages 74 to the chamber 40 and thus to the brakes. A small amount of braking power will supply a small amount of air pressure through the limited passages described. A further application of braking power will move the second piston downward until it contacts the third piston and then will move the third piston downward until the valve element 60 has moved away from its valve seat 62. Air pressure will then flow directly from the inlet 18 to the chamber 40 and thus to the brakes.

If the pressure within the chamber 40 becomes too great, it will move piston 26 in an upward direction, against the service pressure, until valve seat 52 has moved away from valve element 50. The vent ports 22 will then be in communication with the chamber 40 and will bleed off any excess air pressure.

Of particular advantage in this invention is the fact that it is not necessary to overcome the strength of rather large springs to operate the valve. Spring 68, which normally biases the third piston in an upward direction against its valve seat, need not be excessively large as its force is supplemented by air pressure from port 18. It is particularly advantageous to utilize air pressure as a supplement to the spring, thus reducing the size of the spring. A further advantage is the fact that the conventional single spring for biasing a relay valve of this type has been split into two springs, both of which are reduced in size. In this way it is never necessary to overcome the strength of a single large spring. In the first instance, the small spring 54 is overcome and the second piston makes its initial movement. Once the second piston has made its initial movement, chamber 66 is then in communication with chamber 40 and the pressure on piston 58 is equalized so that it is then only necessary to overcome the force of spring 68 to move the third piston to the completely operated position. In other words, the combined force of the spring and air pressure will hold the third piston against its seat, however it is only necessary to move against the force of the spring to move this piston away from its seat.

Whereas the preferred form of the invention has been shown and described herein, it should be realized that there are many modifications, substitutions and alterations thereto within the scope of the following claims.

We claim:

1. In a relay valve a housing, a pressure inlet in said housing, a pressure outlet in said housing, a seat between said pressure inlet and said pressure outlet, a valve piston in said housing, said valve piston being held against said seat by a first yielding means and by pressure delivered to one side of said valve piston from said pressure inlet, a passage through said valve piston, a pilot piston positioned in said housing to control said passage and having a diameter less than that of said valve piston, a second yielding means urging said pilot piston toward its passage-closing position, and means for operating said relay valve including a ported piston freely reciprocal in said housing and movable against said pilot piston in response to service pressure entering said housing, said freely reciprocal piston having a diameter less than that of said valve piston but greater than that of said pilot piston, initial movement of said freely reciprocal piston being effective to move said pilot piston toward its passage-open position to equalize pressures on opposite sides of said valve piston, continuing movement of said freely reciprocal piston being effective to cause said pilot piston to engage said valve piston and to move said valve piston off said seat.

2. The structure of claim 1 wherein said pilot piston, when out of its passage-closing position and when engaging said valve piston, communicates said pressure inlet with said pressure outlet.

3. The structure of claim 1 wherein the force of said second yielding means is substantially less than the combined force of said first yielding means and said pressure entering said pressure inlet and delivered to said one side of said valve piston.

4. The structure of claim 1 characterized by and including a restricted orifice in the wall of said valve piston and communicating said pressure inlet with said one side of said valve piston.

5. A relay valve for use in vehicle air brake systems, including a housing, a pressure inlet in said housing, a pressure outlet in said housing, a seat between said inlet and said outlet, a valve piston in said housing and forming with said housing a chamber on one side of said valve piston, yielding means in said chamber and urging said valve piston toward said seat, a restricted orifice in said valve piston communicating said inlet with said chamber to supply pressure to said one piston side and to urge said valve piston toward said seat, said valve piston including a central passage to communicate said chamber with said outlet, a spool-shaped pilot piston mounted within and reciprocal in said passage to control pressure through said passage, a second yielding means urging said pilot piston toward its passage-closing position, a freely reciprocal service piston having a vent port disposed in said housing, a service pressure inlet positioned in said housing for delivery of service pressure to one side of said service piston to move said service piston toward and into engagement with said pilot piston while closing said vent port, initial movement of said pilot piston being effective to open said central passage to place said inlet and outlet in communication through said passage and said restrictive orifice and to equalize pressure on opposite sides of said valve piston, continued movement of said service piston in contact with said pilot piston being effective to cause said pilot piston to move into contact with said valve piston while said pilot piston remains in its passage-open position whereby said service piston acts through said pilot piston to unseat said valve piston from said seat to further place said inlet in communication with said outlet through said seat.

6. The relay valve as set forth in claim 5 wherein said service piston, said pilot piston and said valve piston are concentrically arranged within said housing.

7. The relay valve as set forth in claim 5 wherein said spool-shaped pilot piston is provided with sealing means on its enlarged ends, one of said sealing means sealing against the service piston, the other of said sealing means sealing against said valve piston, whereby contact of said valve piston with said service piston seals said vent port immediately prior to the opening of said central passage by further movement of said service piston against said pilot piston.

References Cited by the Examiner

UNITED STATES PATENTS

| 941,914 | 11/09 | Corrington | 303—40 |
|---|---|---|---|
| 2,259,809 | 10/41 | Freeman | 303—54 |
| 2,985,490 | 5/61 | Gates | 303—40 |
| 3,092,422 | 6/63 | Alfieri | 303—40 |

FOREIGN PATENTS

| 137,552 | 10/52 | Sweden. |
|---|---|---|
| 409,790 | 2/25 | Germany. |

ARTHUR L. LA POINT, *Primary Examiner.*

EUGENE G. BOTZ, *Examiner.*